United States Patent Office 3,714,036
Patented Jan. 30, 1973

3,714,036
METHOD AND APPARATUS FOR STABILIZING ACCUMULATIONS IN AERATED LAGOONS
Robert W. Slater, Toronto, Ontario, Canada, assignor to Atara Corporation, Montreal, Quebec, Canada
Filed Apr. 12, 1971, Ser. No. 133,012
Int. Cl. C02c 1/02
U.S. Cl. 210—8      9 Claims

ABSTRACT OF THE DISCLOSURE

A method of an an apparatus for purifying sewage in which, when the temperature of the pool rises to above 15° C. after a period of some months below 10° C. the flow of sewage is diverted from one pool to a second pool. Aeration in the first pool is either stopped completely or, alternatively, violently increased. Either method allows the winter's accumulation of decomposable but undecomposed material to be completely digested.

If the aeration is stopped completely, this cessation lasts for about 3 to 6 weeks after which both full sewage flow and aeration are resumed; preferably, some of the completely treated liquid outflow from the second pool is recirculated back to the first pool—this covers the top of the first pool with a layer of treated liquid and reduces the offensive odor and also ensures a gradual displacement of liquid from the first pool.

In the alternative if the pool aeration is increased violently there is no recirculation and little odor but the violent aeration must be maintained for 4 to 8 weeks.

---

This invention concerns sewage treatment and is related to U.S. application 64,508, now abandoned, which is assigned to the same assignee, in that both are concerned with the problem of accumulated undecomposed (but decomposable) organic matter in winter months.

It is known that chemical reactions, including biochemical action, proceed faster with increased temperature; but the normal application of this principle as applied to artificial sewage treatment lagoons gives results that are highly unsatisfactory when the temperature is below maximum but has just increased rapidly. The effect of this is that effluent quality deteriorates markedly in late spring of each year; and aeration capacity has been wasted.

It is, therefore, an object of this invention to improve the effluent quality, particularly in late spring by altering the flow patterns according to the temperature; by another aspect, this object is achieved in a double lagoon installation with particular interconnections with series flow that can be adjusted according to the temperature.

The invention may best be understood by reference to the following drawings which show by way of example one arrangement which alters the flow pattern in this manner.

Figure 5:
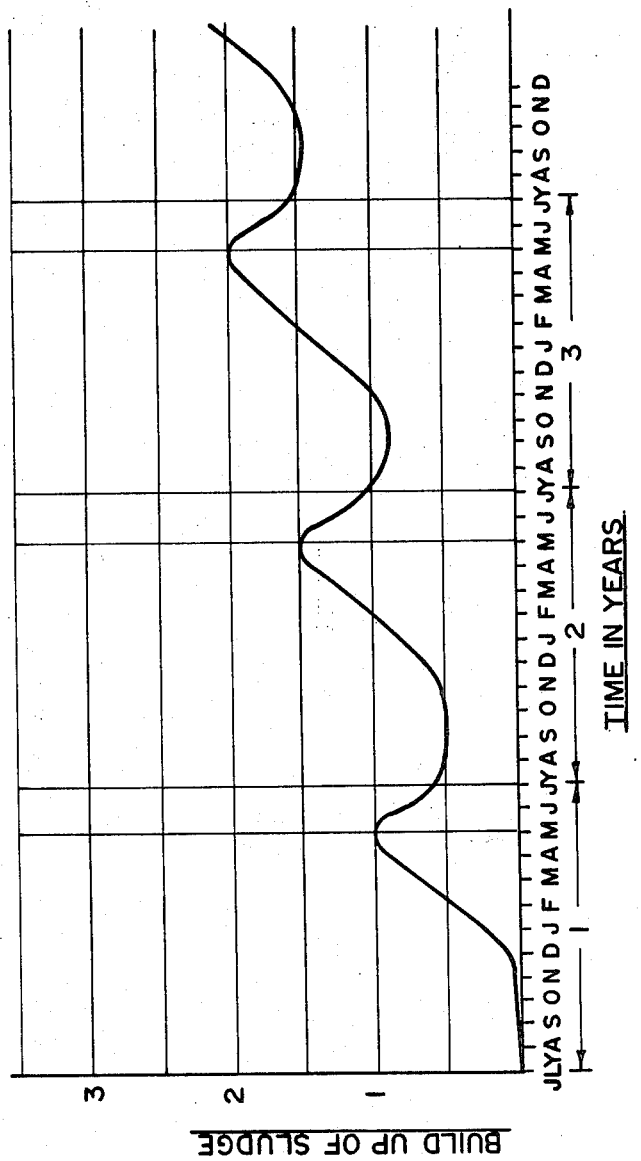
FIG. 5 is a graph which illustrates the build up of decomposeable sludge which occurs in some climates in the course of time in sewage lagoon of the prior art.
Figure 2:
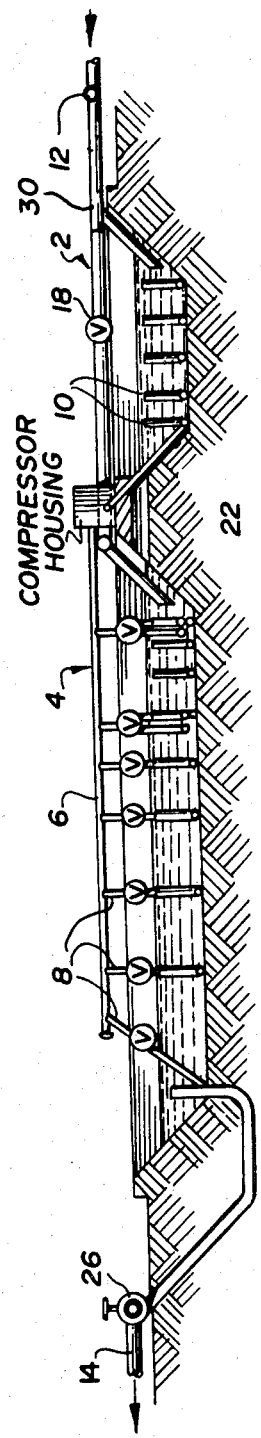
FIG. 2 shows a cross section along the line II—II of FIG. 1.
Figure 4:
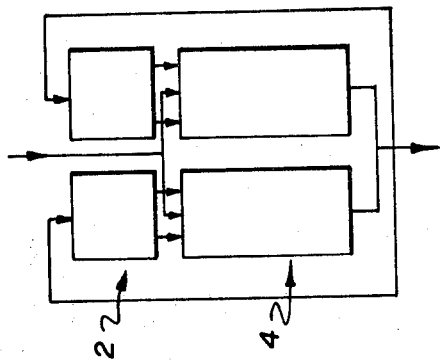
FIG. 4 is a similar illustration of operation in "spring" conditions.

In the drawings there are two lagoon basins 2 and 4; and for reasons which will later be made clear, when these are connected together they are in series, in contrast to known arrrangements for simultaneous parallel flow. For clarity, only one side will be numbered, but it will be understood that the layout is symmetrical about the centre line.

These lagoons are of different size and shape because they perform different functions, and these functions are dependent upon temperature; both typically have a floor 165 feet wide, to facilitate construction but the floor of pool 2 is only 100 feet long whereas the floor of pool 4 is 335 feet long. The length of pool 4 is governed by transit time in "spring," which is itself dependent, of course, on the throughput and pool cross-sectional area. By contrast, the length of pool 2 depends to some extent on the length of "winter" as will be understood after the sequence of operations has been explained further below.

Both pools are aerated by low pressure compressors or blowers in the compressor house which will produce large volumes of air at relatively low gauge pressures. These compressors are connected through distribution pipes 6 and manifolds 8 to aeration devices 10. These devices may take one of many forms and I prefer to use the type known in the trade as the "burp-gun" type which is described in Canadian Pat. 746,669. However, other aeration devices such as a simple nozzle with a shroud or deflector to assist mixing of air and water may be used.

These devices, whatever their form, are spread across the width of each lagoon so that the aeration is laterally uniform, or approximately so. There is a difference in the concentration and layout of these aerators along the length of pools 2 and 4 as can be seen. The reason for this will be explained later.

The double pool is fed by an inlet pipe 12 leading from a main sewer and the outlet pipe 14 leads to the usual chlorination house (not shown) where the quality of effluent is measured.

Inlet pipe 12 bifurcates into two branches. Each branch has a valve 16 which is ganged with valve 18 in bypass pipe 20, so that valve 16 is open while valve 18 is shut and vice versa. The result of this is that there are two paths from inlet to outlet; the first is straight through, via valve 16, coupling 17, pool 2, pool interconnecting transfer pipes 22 and pool 4 to the outlet, and the second bypasses pool 2 and flows directly to pool 4, via valve 18 and bypass pipe 20, so that the inlet is thus connected directly to pool 4 and thence to the outlet isolating pool 2 from raw sewage.

In addition recycling pipe 24, which is smaller than either of pipes 12 or 14 allows a small proportion, typically about 10 percent of the throughput to be recyled. Valve 26 prevents this occurring in normal operation but when it is opened the same control impulse starts the motor attached to pump 28 to enable the small proportion of recycling or feedback to take place.

Figure 3:
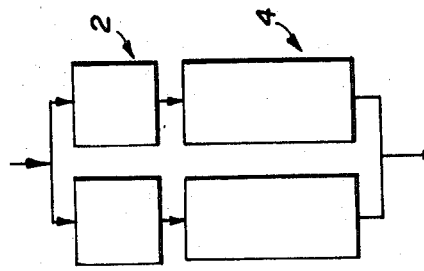
FIG. 3 illustrates, in diagrammatic form, operation in "winter" and "summer" conditions.
Figure 1:
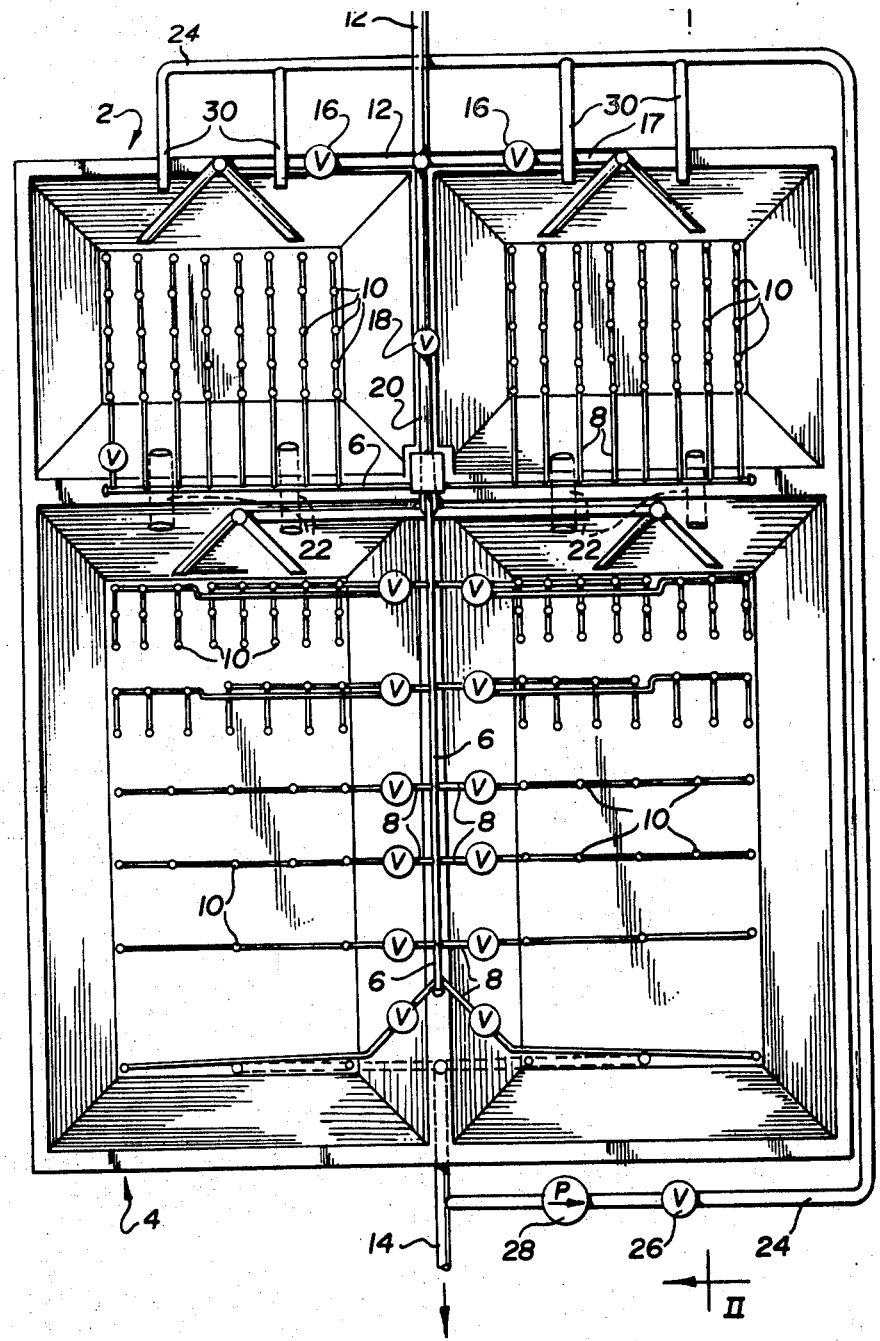
FIG. 1 shows a layout in plan view of the series type double lagoon system; the parallel flow is not a feature of the invention but is merely a practical convenience for operational and maintenance flexibility.

The aerators in pool 2 are operated lightly in "winter" to supply only sufficient air so as to maintain the liquid aerobic during the transit time in pool 2. The result of this gentle aeration is that the heavier decomposeable material will be able to settle on the floor of this pool and will accumulate there until the weather turns warmer in "spring." The liquid flow in "winter" is straight through as shown in FIG. 3.

It will be understood that the terms "winter," "spring" and "summer" correspond to climatic conditions in the Montreal, Ottawa district, and similar areas, to the periods mid-November to mid-May, mid-May to early July and early July to mid-November respectively. However, they relate to lagoon temperatures that are cold (below 10° C.) increasing to warm (rising from 15° to 18° C.) and warm (above 20° C.). The number of aerators actually in use in "winter" will depend to some extent on the type of sewage but, as a rough guide, only 10 or 15 of the 40-12 inch diameter guns shown in pool 2 might be required. Pool 4 is used to extend the residence time to allow the oxygen to break down the sewage but again not much aeration is required in winter and some of the lines can be shut down to reduce power consumption. Therefore, in "winter" sludge deposition occurs very largely in pool 2; and the sloping side of pool 2 which is downstream from inlet coupling 17 acts, in effect, as a barrier to inhibit water borne sludge from entering pool 4 and the transfer pipes 22 are set sufficiently high in the side wall that they do not interfere with sludge deposition.

At the beginning of "spring" the inflow is rerouted directly to pool 4 by closing valves 16 and opening valve 18. The aeration in pool 2 is either shut off completely or alternatively all guns are brought into use to give a violent aeration; the reasons for this will be explained below. Regardless of what happens in pool 2 an aeration considerably more intense than in "winter" must take place in pool 4, partly because the transit time is reduced because of the loss of the transit time of pool 2, and partly because the biological oxygen demand is up due to the increased temperature. This pool must meet the full loading of the system.

Considering first the operation when the aeration in tank 2 ceases completely in "spring" I prefer to recycle some of the treated liquid from tank 4 through pipe 24 by opening valve 26 and starting pump 28. This covers (or tends to cover) the surface of tank 2 with treated water from outlets 30 without disturbing the lower layers and helps to inhibit the highly objectionable odor which is otherwise given off. I will give my theory or explanation of why I think this works after describing the remainder of the operation.

After the aerators have been shut off completely for some 3 to 6 weeks they must be started up in pool 2 and the liquid thoroughly aerated for three or four days before recommencing the raw sewage infeeding. In the "summer"—that is at the beginning of July, valves 16 are opened, and valve 18 is closed. The pump 28 is stopped and valve 26 is closed; the operation then is in the straight series fashion. The connections are the same as for "winter" but it is usually necessary to bring a few more aerators into operation for reasons which will now be described.

Although I do not wish to be bound by the explanation below, I consider that is has not been recognized hitherto that it is important to distinguish between two distinct processes; the cause of this may have been that much of the research on aerated lagoon processes has been carried out in the southern United States where temperatures rarely drop much below 20° C. and the difference at this temperature is insignificant.

Sewage decomposition may occur, then, by either of two processes, aerobic or anaerobic. A bacterial aerobic process converts the simpler products of decomposition into organic acids and alcohols and carbon dioxide is also produced. The more complex products have a large molecular weight and tend to be slightly heavier than the natant liquid and are deposited as a sludge; once on the lagoon floor, they undergo bacterial anaerobic decomposition with the production of methane and some simpler, lighter compounds which tend to float and are aerobically oxidized.

At 20° C., given sufficient aeration, I believe that the decomposition is mainly aerobic and the decomposition of the settled sludge is approximately the same as the rate of settling out of high molecular weight material. There is, of course, a small net deposition because sewage usually includes a small proportion of mineral matter, sand or soil, plastic fragment, woven fabric and the like. However, this accumulation has little or no effect upon the operation.

Unfortunately, at 5° C. although the aerobic process is still active, the high molecular weight residue accumulates because the anaerobic process is so much slower as to be virtually dormant at this temperature.

When the temperature increase to about 15° C., anaerobic activity also increases. Unfortunately this occurs in the underneath layers of the sludge and the methane generated tends to lift the recently deposited layers into the oxygenated layers. This results in a much increased oxygen demand and a markedly reduced effluent quality in "spring." Moreover, there appear to be a long term effect which is not, as yet, completely understood: the duration of poor effluent quality increases year by year which suggests that the degree of activity is insufficient in warm months to provide a completely stabilized bottom sludge.

This partial stabilization means that a percentage of the sludge accumulated over one winter will still be present in the next winter. It may be that the violent aeration that has been employed in spring after effluent quality has deteriorated is too late and merely inhibits anaerobic decomposition. The effect of this is illustrated in FIG. 5 which shows the yearly build up. Of course, the curve is illustrative in that the total time in years and deposit depth to reach complete system breakdown are far removed from the origin, yet without the recurring warm periods a plant which is fully loaded from start up could be expected to suffer by becoming badly inefficient within 5-7 years.

Whatever the explanation the effect of isolation and ceasing aeration is that the decomposition occurs much faster as the liquid is not disturbed unduly and this increase may be two-fold. That is, the winter's accumulation of sludge is decomposed within about 3 to 6 weeks whereas normally the deterioration in effluent quality noticed in "spring" usually lasts for 8 weeks or so.

While leaving the liquid undisturbed in the lower layer as mentioned above, I prefer to recycle some treated good quality effluent which has bypassed pool 2 and has been aerated in pool 4; not only does such a recycling considerably reduce offensive odor from the liquid with anaerobically decomposing sludge in suspension but it allows gradual and controlled displacement of the liquid resulting from the decomposition winter accumulation of sludge. A typical value is 10% of the throughput.

In the alternative method the violent aeration of pool 2 ensures that no odor is generated but decomposition takes longer (about 4-8 weeks total time) than if the air is shut off completely.

However, the advantage of this method over the prior art as mentioned in U.S. patent application Ser. No. 64,508 is that the winter's accumulation of material is fully stabilized and aerobically decomposed before it leaves pool 2. In that previous application excess oxygen was needed and the length of the pool was unduly long; otherwise liquid might be discharged which was not completely stabilized although oxygen was available in it. Thus, some over aeration was required to give a "factor of safety" throughout the "summer."

As will be understood by those familiar with such lagoons the parallel arrangement shown while not essential, allows flexibility in operation. In flows over 0.6 million gallons per day any one of the four pools can be shut off, both from effluent flow and aeration, for maintenance and inspection.

While there has been shown and described what is at present considered the preferred embodiment of the invention, it will be obvious to those skilled in the art that various changes and modifications may be made therein without departing from the invention as defined by the appended claims.

I claim:

1. A method of purifying sewage comprising the steps of:

feeding raw sewage successively through two pools in series when the temperature is below 10° C. and lightly aerating both pools, thus allowing decomposeable but undecomposed material to settle in the first pool.

bypassing the first pool when the temperature starts rising from below 10° to above about 15° C. and feeding sewage directly into the second pool while aerating the second pool more heavily than before, resuming raw sewage feed successively through the two pools in series after three to six weeks bypassing and aerating.

2. A method as claimed in claim 1 in which the material in the first pool is violently aerated so as to aerobically stabilize the sludge during the bypassing while raw sewage is fed directly to the second pool.

3. A method as claimed in claim 2 in which the bypassing continues for 4–8 weeks.

4. A method as claimed in claim 1 in which all aeration stops in the first pool when bypassing begins so as to allow sludge stabilization by anaerobic action.

5. A method as claimed in claim 4 in which bypassing of the first pool by the raw sewage infeed lasts for 3–6 weeks.

6. A method as claimed in claim 5 in which vigorous aeration is applied for a few days before recommencing raw sewage infeed to the first pool.

7. A method as claimed in claim 4 in which a small proportion of treated liquid from the second pool is recycled back to the surface of the first pool when said first pool is bypassed by said raw sewage infeed.

8. A sewage treatment installation comprising:
a first pool;
means to aerate liquid in said first pool;
a second pool;
means to aerate liquid in said second pool;
a raw sewage inlet means, means coupling said inlet means to the first pool;
a treated liquid outlet means connected to the second pool;
interconnecting means between said first and second pools enabling series flow to occur therethroughout;
bypass means coupling the raw sewage inlet means to the second pool; and
valve means enabling the raw sewage inlet means to be connected to either the first pool coupling means or the bypass means.

9. A sewage treatment installation as claimed in claim 8 and further comprising a recycling means to transfer treated liquid from the outlet of the second pool to the surface at the inlet of the first pool so that when raw sewage bypasses the first pool and is fed directly into the second pool than a portion of the treated effluent may be recycled into the first pool.

References Cited

UNITED STATES PATENTS 3,234,123  2/1966  Hinde _____ 210—7
3,485,750  12/1969  Albertson _____ 210—195 X MICHAEL ROGERS, Primary Examiner U.S. Cl. X.R.

210—16, 195, 253, 254